United States Patent
Zhou et al.

(10) Patent No.: US 9,902,247 B2
(45) Date of Patent: Feb. 27, 2018

(54) METHOD FOR MANUFACTURING VEHICLE WINDOW COMPONENT AND VEHICLE WINDOW COMPONENT

(71) Applicant: SAINT-GOBAIN GLASS FRANCE, Courbevoie (FR)

(72) Inventors: Jun Zhou, Shanghai (CN); Jianhong Hu, Shanghai (CN)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/036,158

(22) PCT Filed: Nov. 20, 2014

(86) PCT No.: PCT/CN2014/091760
§ 371 (c)(1),
(2) Date: May 12, 2016

(87) PCT Pub. No.: WO2015/074581
PCT Pub. Date: May 28, 2015

(65) Prior Publication Data
US 2016/0288633 A1    Oct. 6, 2016

(30) Foreign Application Priority Data
Nov. 21, 2013    (CN) .......................... 2013 1 0594320

(51) Int. Cl.
*B60J 10/02*    (2006.01)
*B60J 10/16*    (2016.01)
(Continued)

(52) U.S. Cl.
CPC .......... *B60J 10/16* (2016.02); *B29C 45/0025* (2013.01); *B29C 45/14336* (2013.01);
(Continued)

(58) Field of Classification Search
CPC .......... Y10T 428/23; B60J 10/16; B60J 10/70; B29C 45/14434
See application file for complete search history.

(56) References Cited

U.S. PATENT DOCUMENTS 5,944,324 A    8/1999    Schultheis et al.
6,754,971 B1    6/2004    Hagenmeyer et al.
(Continued)

FOREIGN PATENT DOCUMENTS

CN    1598233 A    3/2005
CN    102180081 A    9/2011
(Continued)

OTHER PUBLICATIONS

First Office Action as issued in Chinese Patent Application No. 201310594320.X, dated May 5, 2016.
(Continued)

*Primary Examiner* — Alexander Thomas
(74) *Attorney, Agent, or Firm* — Pillsbury Winthrop Shaw Pittman LLP

(57) ABSTRACT

A method for manufacturing a vehicle window component and a vehicle window component, wherein the method for manufacturing the vehicle window comprises: providing a vehicle window substrate and an elastic body; adhering the elastic body to a surface of the vehicle window substrate, wherein the surface is close to a lateral side of the vehicle window substrate; and implementing an injection molding process for forming an encapsulation, wherein the injection molding process is performed at an injection molding temperature lower than a melting temperature of the elastic body. The method for manufacturing a vehicle window component and the vehicle window component provided by the present disclosure may have no shrink mark.

14 Claims, 4 Drawing Sheets

(51) Int. Cl.

| | | |
|---|---|---|
| B29C 45/14 | (2006.01) | |
| B29C 45/00 | (2006.01) | |
| B60J 1/10 | (2006.01) | |
| B60J 10/27 | (2016.01) | |
| B60J 10/50 | (2016.01) | |
| B60J 10/70 | (2016.01) | |
| B29C 45/16 | (2006.01) | |
| B29C 65/48 | (2006.01) | |
| B29C 65/00 | (2006.01) | |
| B32B 3/08 | (2006.01) | |
| B32B 3/26 | (2006.01) | |
| B32B 7/12 | (2006.01) | |
| B32B 17/06 | (2006.01) | |
| B32B 25/08 | (2006.01) | |
| B32B 27/08 | (2006.01) | |
| B29L 31/26 | (2006.01) | |
| B29L 31/30 | (2006.01) | |
| B29L 31/00 | (2006.01) | |

(52) U.S. Cl.
CPC .. *B29C 45/14377* (2013.01); *B29C 45/14434* (2013.01); *B29C 45/14778* (2013.01); *B29C 45/14795* (2013.01); *B29C 45/14811* (2013.01); *B29C 45/1671* (2013.01); *B29C 45/1676* (2013.01); *B29C 65/4825* (2013.01); *B29C 66/4722* (2013.01); *B29C 66/712* (2013.01); *B29C 66/7315* (2013.01); *B29C 66/73365* (2013.01); *B29C 66/7465* (2013.01); *B32B 3/08* (2013.01); *B32B 3/26* (2013.01); *B32B 7/12* (2013.01); *B32B 17/064* (2013.01); *B32B 25/08* (2013.01); *B32B 27/08* (2013.01); *B60J 1/10* (2013.01); *B60J 10/27* (2016.02); *B60J 10/50* (2016.02); *B60J 10/70* (2016.02); *B29C 2045/0043* (2013.01); *B29C 2045/14868* (2013.01); *B29K 2995/0026* (2013.01); *B29K 2995/0046* (2013.01); *B29L 2031/265* (2013.01); *B29L 2031/30* (2013.01); *B29L 2031/3052* (2013.01); *B29L 2031/778* (2013.01); *B32B 2250/03* (2013.01); *B32B 2255/10* (2013.01); *B32B 2255/26* (2013.01); *B32B 2307/51* (2013.01); *B32B 2605/006* (2013.01); *B32B 2605/08* (2013.01)

(56) References Cited

U.S. PATENT DOCUMENTS

| | | | |
|---|---|---|---|
| 7,059,656 B2 * | 6/2006 | Mikkaichi | B60J 10/16 296/146.15 |
| 2005/0091935 A1 | 5/2005 | Amano et al. | |
| 2008/0031991 A1 | 2/2008 | Choi et al. | |
| 2012/0126567 A1 | 5/2012 | Timmermann | |

FOREIGN PATENT DOCUMENTS

| | | |
|---|---|---|
| CN | 102470739 A | 5/2012 |
| CN | 103057384 A | 4/2013 |
| CN | 103587029 A | 2/2014 |
| JP | H03-292120 A | 12/1991 |

OTHER PUBLICATIONS

International Search Report and the Written Opinion of the International Searching Authority as issued in International Patent Application No. PCT/CN2014/091760, dated Feb. 15, 2015.

* cited by examiner

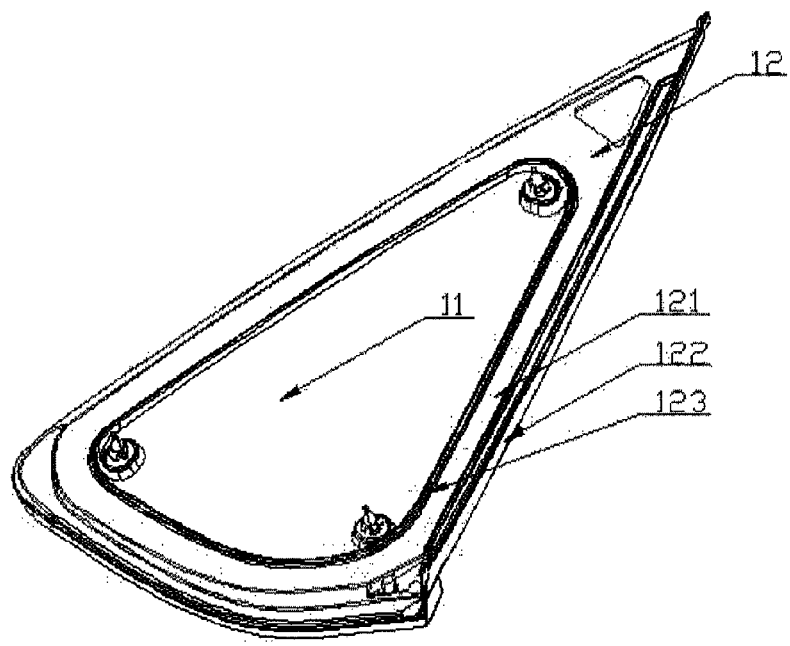

FIG. 1 (prior art)

```
providing a vehicle window substrate and an elastic body    — S101 adhering the elastic body to a surface of the vehicle
window substrate, wherein the surface is close to a         — S102
lateral side of the vehicle window substrate implementing an injection molding process for
forming an encapsulation, wherein the injection molding     — S103
process is performed at an injection molding temperature
lower than a melting temperature of the elastic body
```

FIG. 2

METHOD FOR MANUFACTURING VEHICLE WINDOW COMPONENT AND VEHICLE WINDOW COMPONENT

CROSS-REFERENCE TO RELATED APPLICATIONS

This application is the national phase of International Application No. PCT/CN2014/091760, filed on Nov. 20, 2014, which claims the benefit of priority to Chinese Patent Application No. 201310594320.X, filed on Nov. 21, 2013, and entitled "METHOD FOR MANUFACTURING VEHICLE WINDOW COMPONENT AND VEHICLE WINDOW COMPONENT", the entire disclosure of which is are incorporated herein by reference.

TECHNICAL FIELD

The present disclosure generally relates to glass encapsulation technology, and more particularly, to a method for manufacturing vehicle window component and a vehicle window component.

BACKGROUND

With rapid development of automotive technology, encapsulation products for auto glass are becoming more and more diverse and complex. Generally, an encapsulation is formed on a periphery of a piece of auto glass via an injection molding process, so as to improve sealing property, noise reduction performance, and safety of the auto glass.

According to a Chinese patent application whose Publication Number is CN102180081A, an automobile rear corner window assembly is disclosed. Referring to FIG. 1, a schematic diagram of the automobile rear corner window assembly according to the above mentioned Chinese patent application is illustrated. The automobile rear corner window assembly includes: a piece of glass 11, and a glass encapsulation 12 formed on a periphery of the piece of glass 11. Further, the glass encapsulation 12 includes a coating glue surface 121, a lip 122 and a glue slot 123. The glue slot 123 which is formed on the coating glue surface 121 is used for being coated with glass glue. The glue slot 123 is able to prevent transverse flow of the glass glue, so as to avoid glue leakage. The lip 122 which is configured to have a sheet shape can deform under compression. The glass encapsulation 12 is formed via an injection molding process.

The injection molding process includes: plasticizing a raw material, so as to form a solution; thereafter, injecting the solution into a mold cavity where the solution cools and hardens, so as to form an injection-molded part which matches with a shape of the mold cavity.

However, when conventional technologies are applied to form the glass encapsulation, the solution would shrink in the mold cavity due to the cooling process, thus shrink marks may appear on a surface of the encapsulation. As a result, the glass encapsulation formed by injection molding has a dimension smaller than the designed dimension. Accordingly, the glass encapsulation is incapable of well matching with other parts of an automobile window, and the shrink marks formed on the surface of the encapsulation also affect aesthetic appearance of the automobile.

SUMMARY

Embodiments of the present disclosure provide methods for manufacturing a vehicle window component, which is able to reduce or eliminate shrink marks on an encapsulation formed by an injection molding process, and also provide vehicle window components with less shrink marks.

According to one aspect of the present disclosure, a method for manufacturing a vehicle window component is provided, including: providing a vehicle window substrate and an elastic body; adhering the elastic body to a surface of the vehicle window substrate, wherein the surface is close to a lateral side of the vehicle window substrate; and implementing an injection molding process for forming an encapsulation which embraces the elastic body, wherein the injection molding process is performed at an injection molding temperature lower than a melting temperature of the elastic body.

A basic concept is that, by adhering an elastic body to a surface of a vehicle window substrate which is close to a lateral side of the vehicle window substrate, disposing the lateral side together with the elastic body into a mold cavity and implementing an injection molding process to form an encapsulation thereon, the thickness of the formed encapsulation can be reduced because of the existence of the elastic body, which means the thickness of the solution injected onto the window substrate for forming the encapsulation is reduced. Therefore, a difference between an inside temperature of the solution and the surface temperature thereof, which would result in different shrink ratios, may not be too great. Furthermore, the elastic body which is disposed in the encapsulation of the vehicle window is able to relieve stress during the cooling of the solution. When the shrink ratio of the inner portion is inconsistent with that of the outer surface of the injection molding solution, the elastic body is able to relieve the shrinkage of the outer surface of the injection molding solution during the cooling molding process. Thus, shrink marks of the encapsulation are able to be reduced or eliminated.

In one embodiment, the elastic body is porous. The porous elastic body is able to play an effective role of supporting a solidifying of the plasticized solution. Further, the porous elastic body has better elasticity, thus stress caused by shrink ratio difference of the injection molding solution is able to be balanced out, where the shrink ratio difference is caused by the temperature difference.

In one embodiment, a ratio of a thickness of the elastic body to a thickness of the encapsulation is less than or equal to 20%. Such a parameter preference is able to further reduce a cooling velocity difference between the inner portion and the outer portion of the injection molding solution. In addition, when the thickness of the encapsulation is not the same, the parameter preference is able to smooth the shrink ratio differences between different regions of the injection molding solution, so as to avoid shrink marks.

In one embodiment, a minimum linear distance between the elastic body and an outer edge of the vehicle window substrate is larger than or equal to 4 mm, thus the encapsulation can encompass the elastic body and the vehicle window substrate well.

According to another aspect of the present disclosure, a vehicle window component is provided, including: a vehicle window substrate; an elastic body adhered to a surface of the vehicle substrate, wherein the surface is close to a lateral side of the vehicle substrate; and an encapsulation located on the lateral side and embracing the elastic body.

A basic concept is that, the elastic body is able to restrain the inner stress of the vehicle window component, and well support the solidifying of the plasticized solution.

In one embodiment, the elastic body is porous. The porous elastic body is able to reduce a weight of the vehicle window component, and provide a well support. Furthermore, the porous elastic body has an improved effect of stress restraining.

In one embodiment, the encapsulation includes: a rigid plastic layer embracing the elastic body; and a flexible plastic layer overlaying at least a portion of the rigid plastic layer. During the formation of the encapsulation according to this embodiment, the shrink ratios of different parts of the encapsulation may have minor difference. Plus the stress restraining effect benefited from the elastic body, shrink marks may be further reduced.

BRIEF DESCRIPTION OF THE DRAWINGS

FIG. 1 schematically illustrates an existing automobile rear corner window assembly;

FIG. 2 schematically illustrates a flowchart of a method for manufacturing a vehicle window component according to one embodiment of the present disclosure;

DETAILED DESCRIPTION

Figure 3:
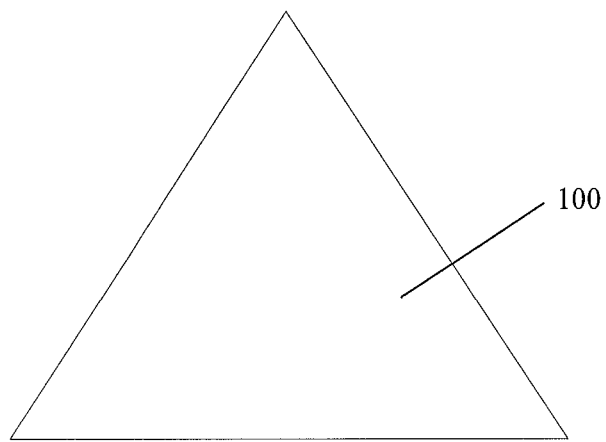
FIGS. 3-5 schematically illustrate a process for manufacturing a vehicle window component according to one embodiment of the present disclosure.

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Automobile encapsulations formed by injection molding processes tend to have shrink marks, the shrink marks will affect aesthetic appearance of automobile and lead to undesired dimensions of the glass encapsulations, thus the glass encapsulations are not able to well match with other parts of automobile windows.

Through deep analysis of existing technical processes and principles of the injection molding process, reasons of shrink marks generated on surfaces of the automobile encapsulations are able to be conceived. Specifically, some automobile encapsulation products have large injection molding thicknesses, when injection molding solution cools in a mold cavity, an outer surface of the solution has lower temperature and cools faster, an inner portion of the solution has higher temperature and cools slower. As such, when the outer surface of the solution has already cooled down to shape up, the inner portion thereof has not been molded yet. Thereafter, during the cooling of the inner portion, the volume of the inner injection solution tends to reduce, so stress will be generated between the already molded outer portion and the shrinking inner portion. Therefore, convex and concave marks will be generated on the outer surface of the automobile encapsulation which has already been molded through cooling. In some other automobile encapsulation products, such as terrace-shaped automobile encapsulations, the thickness of the automobile encapsulations varies. In this case, at different positions of the automobile encapsulation, quantities of the solutions injected are different, so shrink ratios at the different positions are different. Therefore, shrink marks tend to appear on junctions between the different positions with different thicknesses.

Based on the above analysis, in one embodiment of the present disclosure, an encapsulation is formed via an injection molding process as follows: adhering an elastic body on a surface of a vehicle window substrate which is close to a lateral side of the vehicle window substrate; disposing the lateral side together with the elastic body into a mold cavity; and forming the encapsulation by injection molding. A solution is used in the injection molding, which is injected onto the lateral side and the elastic body. When the solution cools down and shape up, it constitutes the encapsulation. The elastic body occupies some amount of the designed volume of the encapsulation, so that the encapsulation formed on the elastic body can be made thinner, which means the thickness of the solution can be reduced. Therefore, a difference between an inside temperature of the solution and the surface temperature thereof may be reduced. Furthermore, the elastic body which is disposed in the encapsulation of the vehicle window is able to relieve stress during the cooling process of the solution. Accordingly, when the shrink ratio of the inner portion is inconsistent with that of the outer surface of the injection molding solution, the elastic body is able to reduce the shrinkage of the outer surface of the injection molding solution during the cooling molding process. Thus, shrink marks of the encapsulation are able to be reduced or eliminated.

In order to clarify the objects, characteristics and advantages of the present disclosure, embodiments of the present disclosure will be described in detail in conjunction with the accompanying drawings.

Referring to FIG. 2, a flowchart of a method for manufacturing a vehicle window component is illustrated, including follow steps.

S101, providing a vehicle window substrate and an elastic body.

In the present disclosure, the vehicle window substrate may be made of transparent material such as organic glass, polyvinyl chloride or inorganic glass. Further, the vehicle window substrate may be configured to have any suitable shape and size. In another word, there is no limitation to the specific shape and size of the vehicle window substrate. Person skilled in the art may select a preferable shape and size of the vehicle window substrate according to requirements of the vehicle window component being manufactured. Thus, protection scope of the present disclosure should not be limited by the shape and the size of the vehicle window substrate.

The elastic body may be made of triphenyl phosphate, vulcanized rubber, ethylene-propylene-diene monomer (EPDM) rubber or polyurethane. The elastic body may be porous, so as to play an effective role of supporting the solidifying of the plasticized solution. In addition, the porous elastic body has better elasticity, thus stress caused by shrink ratio difference of the injection molding solution is able to be balanced out effectively, where the shrink ratio difference is caused by temperature difference.

In this embodiment, referring to FIG. 3, the vehicle window substrate 100 which is configured to have a triangle shape is taken as an example for illustration. It should be noted that, in some other embodiments, the vehicle window substrate 100 may be configured to have a trapezoid shape, a rhombus shape or a rectangle shape.

Figure 4:

A shape of the elastic body is determined by the shape and the size of the vehicle window substrate. As one embodiment, referring to FIG. 4, the elastic body 110 is configured to have a strip-shape which is corresponding to a surface of the vehicle window substrate, wherein the surface is close to a lateral side of the vehicle window substrate. Thus, the elastic body 110 is able to be easily adhered to the surface of the vehicle window substrate which is close to the lateral side of the vehicle window substrate. Thereafter, the elastic body 110 is able to be used for supporting the solidifying of the plasticized solution.

S102, adhering the elastic body to a surface of the vehicle window substrate, wherein the surface is close to a lateral side of the vehicle window.

Figure 5:
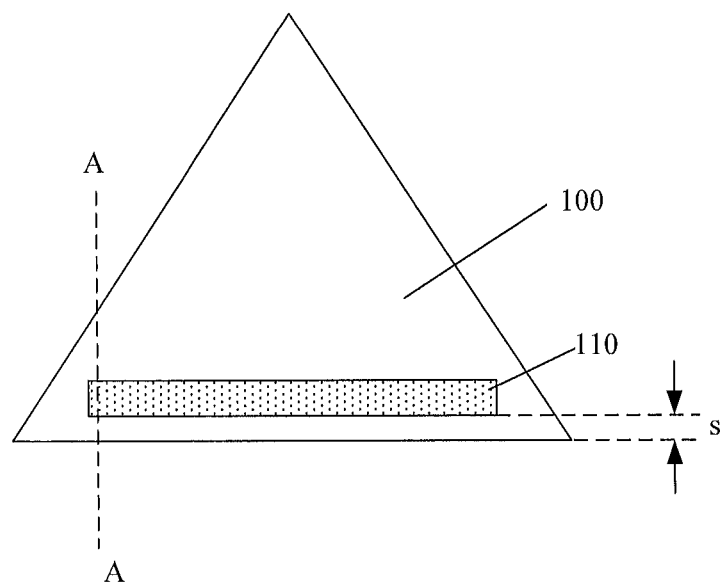

Referring to FIG. 5, the elastic body 110 is adhered to the surface of the vehicle window substrate 100 via an acrylic pressure-sensitive adhesive or a silicone pressure-sensitive adhesive.

The elastic body is fixed to the vehicle window substrate by means of adhering, thus the fixation will be simplified and the rework cost will be reduced.

In order to reduce the shrink marks of the vehicle window component in a solidifying process, an installation site of the elastic body 110 is set to be a surface of the vehicle window substrate 100, wherein the surface is close to the lateral side of the vehicle window substrate. By such way, in the cooling process thereafter, a cooling velocity of the inner portion of the plasticized solution and that of the outer portion of the plasticized solution tend to be consistent, and temperatures of the plasticized solution in different positions of the vehicle window component 100 also tend to be consistent. Accordingly, the entire vehicle window component may have uniform shrink ratio in the solidifying process, thus there is less possibility of generating severe shrink marks.

S103, implementing an injection molding process for forming an encapsulation which embraces the elastic body, wherein the injection molding process is performed at an injection molding temperature lower than a melting temperature of the elastic body.

In one embodiment, the injection molding process is implemented to the lateral side which is adhered with the elastic body, for forming the encapsulation, by disposing the lateral side which is adhered with the elastic body into a mold cavity and implementing the injecting molding process for forming the encapsulation thereafter, wherein the encapsulation embraces the elastic body, and the mold cavity matches with the automobile glass encapsulation being formed.

It should be noted that, the elastic body is fixed to the surface of the vehicle window substrate, wherein the surface is close to the lateral side of the vehicle window substrate. Thus, in a cooling process of the injection molding process for forming the encapsulation, as the elastic body is embraced by the encapsulation, stress caused by inconsistence of the cooling velocity of the inner portion and that of the outer portion of the injection molding solution is able to be relieved by the elastic body. Furthermore, as the thickness of the formed encapsulation can be reduced because of the existence of the elastic body, the thickness of the solution injected onto the window substrate for forming the encapsulation is reduced. Thus, the temperature difference of the inner portion and that of the outer surface of the injection molding solution is reduced. Plus the stress restraining effect of the elastic body, shrinkage of the outer surface of the injection molding solution will be further relieved. Therefore, the shrink marks of the encapsulation may be reduced or eliminated.

Figure 6:
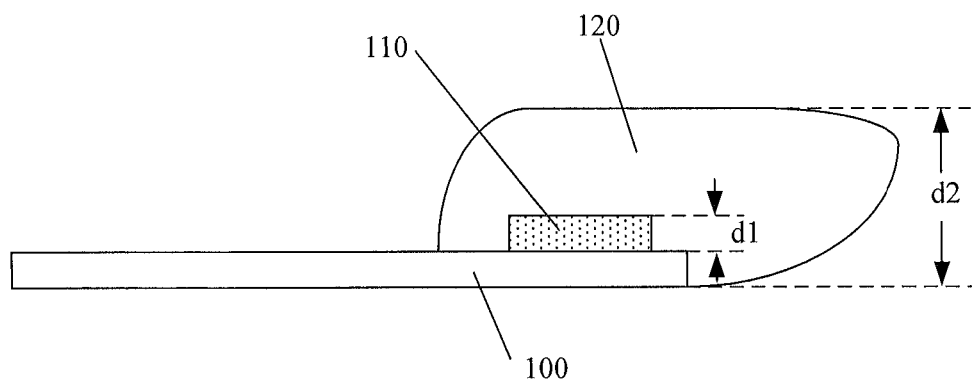
FIG. 6 schematically illustrates a cross-sectional diagram of the vehicle window component along line A-A in FIG. 5 after an encapsulation being formed via an injection molding process according to one embodiment of the present disclosure.

Referring to FIG. 6, sectional diagram of the vehicle window component along line A-A in FIG. 5 after the encapsulation being formed by the injection molding process is illustrated. It can be seen that, the encapsulation 120 is formed on a lateral side of the vehicle window substrate 100, wherein the lateral side is adhered with the elastic body 110.

Optionally, the elastic body is porous. The porous elastic body is able to play an effective role of supporting in the solidifying process. Further, the porous elastic body has better elasticity, thus stress caused by shrink ratio difference of the injection molding solution is able to be balanced out, where the shrink ratio difference is caused by the temperature difference.

Specifically, the injection molding process which is used for forming the encapsulation is implemented by: forming a plasticized solution; pouring the plasticized solution into a mold cavity where the plasticized solution shapes up through cooling.

It should be noted that, the injection molding process should be performed at an injection molding temperature lower than a melting temperature of the elastic body, thus the elastic body is able to maintain the stress restraining effect in the injecting molding process.

In order to make the encapsulation 120 encompassing the elastic body 110 and the vehicle window substrate 100 well, in one embodiment, a ratio of a thickness d1 of the elastic body 110 to a thickness d2 of the encapsulation 120 is less than or equal to 20% (referring to FIG. 6). The thickness d1 of the elastic body 110 refers to a distance between a top surface of the elastic body and a bottom surface of the elastic body; the thickness d2 of the encapsulation 120 refers to a distance between a top surface of the encapsulation and a bottom surface of the encapsulation. In one embodiment, the encapsulation 120 being formed has a top with a flat surface and a bottom with a flat surface, the thickness d2 of the encapsulation 120 refers to a distance between the flat surface of the top and the flat surface of the bottom. In another embodiment, the encapsulation 120 being formed has a top (or a bottom) with a arc-shaped surface and a bottom (or a top) with a flat surface, the thickness d2 of the encapsulation 120 refers to a distance between a tangent line of the arc-shaped surface of the top (or the bottom) and the flat surface of the bottom (or the top). In another embodiment, the encapsulation 120 being formed has a top and a bottom which are both have a arc-shaped surface, the thickness d2 of the encapsulation 120 refers to a distance between a tangent line of the arc-shaped surface of the top and a tangent line of the arc-shaped surface of the bottom. Furthermore, a minimum linear distance s between the elastic body 110 and an outer edge of the vehicle window substrate 100 is larger than or equal to 4 mm (referring to FIG. 5).

Figure 7:
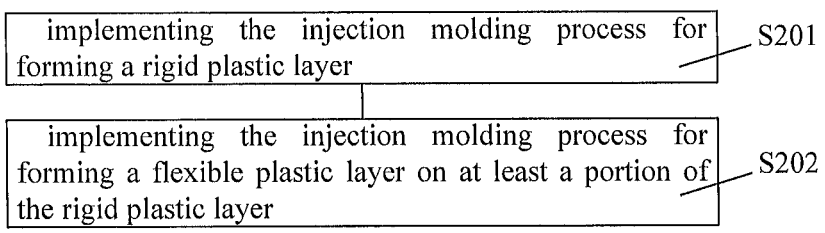
FIG. 7 schematically illustrates a process for forming an encapsulation of a vehicle window component via an injection molding process according to one embodiment of the present disclosure.

In another embodiment, referring to FIG. 7, implementing an injection molding process for forming the encapsulation includes the follow steps.

S201, implementing the injection molding process for forming a rigid plastic layer.

The injection molding process is implemented to the lateral side which is adhered with the elastic body so as to form the rigid plastic layer. The rigid plastic layer may be made of polypropylene, polyamide, polyethylene or nylon 66, so that the rigid plastic layer is able to have a larger strength. Therefore, the rigid plastic layer is able to effectively protect the transparent substrate from being damaged by external factors, and prevent rain and air from penetrating through.

The rigid plastic layer may have a thickness ranges from 1 mm to 8 mm. For example, the rigid plastic layer may have a thickness of 1 mm, 4 mm or 8 mm, and so on, which may vary according to different requirements.

S202, implementing the injection molding process for forming a flexible plastic layer on at least a portion of the rigid plastic layer.

The flexible plastic layer may be made of thermoplastic elastic body or polyvinyl chloride, so as to achieve a better fitting with the vehicle.

The flexible plastic layer may have a thickness ranges from 0.4 mm to 7 mm. For example, the flexible plastic layer may have a thickness of 0.4 mm, 1 mm, 3.5 mm or 7 mm, and so on.

In practice, the flexible plastic layer may be formed on a portion of the rigid plastic layer, depending on requirements of the vehicle window component.

In other embodiments, the flexible plastic layer may overlay the entire rigid plastic layer.

In this embodiment, the rigid plastic layer is formed firstly, and the flexible plastic layer is formed on the rigid plastic layer thereafter. In the step of forming the to rigid plastic layer, the thickness of the rigid plastic layer is able to be selected flexibly. As the rigid plastic layer has a relatively high cooling velocity, and plus the stress restraining effect of the elastic body, different positions of the rigid plastic layer may have a synchronous cooling velocity. Accordingly, the shrink marks may not appear on the rigid plastic layer, thus the surface of the rigid plastic layer may have better uniformity and smoothness. Thereafter, the flexible plastic layer is able to be formed on a high quality rigid plastic layer. The flexible plastic layer itself is able to restrain the stress, and the elastic body which is fixed to the lateral side is also able to restrain the stress, thus an inner stress generated in the cooling process may have little effect to the flexible plastic layer. Therefore, shrink marks may not appear on the surface of the flexible plastic layer.

Referring to FIG. 6, the present disclosure also provides a vehicle window component, including:
 a vehicle window substrate 100;
 an elastic body 110 adhered to a surface of the vehicle window substrate 100, wherein the surface is close to a lateral side of the vehicle window substrate 100; and
 an encapsulation 120 located on the lateral side, wherein the encapsulation 120 embraces the elastic body 110.

Specifically, in the present disclosure, the vehicle window substrate 100 may be made of transparent material such as organic glass, polyvinyl chloride or inorganic glass. Further, the vehicle window substrate may be configured to have any suitable shape and size. In another word, there is no limitation to the specific shape and size of the vehicle window substrate. Person skilled in the art may select a preferable shape and size of the vehicle window substrate according to requirements of the vehicle window component being manufactured. Thus, protection scope of the present disclosure should not be limited by the shape and the size of the vehicle window substrate The elastic body 110 may be made of triphenyl phosphate, vulcanized rubber, EPDM rubber or polyurethane. The elastic body may be porous, so as to play an effective role of supporting the solidifying of the plasticized solution. Further, the porous elastic body has better elasticity, thus a stress caused by shrink ratio difference of the plasticized solution is able to be balanced out, where the shrink ratio difference is caused by the temperature difference.

In order to make the encapsulation 120 encompassing the elastic body 110 and the vehicle window substrate 100 well, in one embodiment, a ratio of a thickness of the elastic body 110 to a thickness of the encapsulation 120 is less than or equal to 20%, and a minimum linear distance s between the elastic body 110 and an outer edge of the vehicle window substrate 100 is larger than or equal to 4 mm.

The elastic body 110 is adhered to the surface of the vehicle window substrate 100 via acrylic pressure-sensitive adhesive or silicone pressure-sensitive adhesive.

Figure 8:
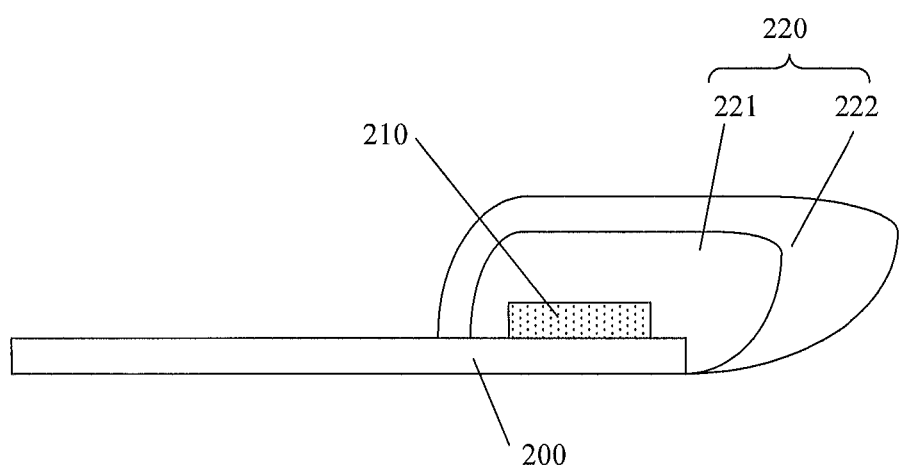
FIG. 8 schematically illustrates a cross-sectional diagram of a vehicle window component according to one embodiment of the present disclosure.

In another embodiment, referring to FIG. 8, a vehicle window component is provided, including:
 a vehicle window substrate 200;
 an elastic body 210 adhered to a surface of the vehicle window substrate 200, wherein the surface is close to a lateral side of the vehicle window substrate 200; and
 an encapsulation 220 located on the lateral side, wherein the encapsulation 220 embraces the elastic body 210;
 wherein the encapsulation 220 includes: a rigid plastic layer 221 embracing the elastic body 210; and a flexible plastic layer 222 overlaying at least a portion of the rigid plastic layer 221.

In this embodiment, the rigid plastic layer 221 is formed firstly, and the flexible plastic layer 222 is formed on the rigid plastic layer 221 thereafter. In the step of forming the rigid plastic layer 221, the thickness of the rigid plastic layer 221 is able to be selected flexibly. As the rigid plastic layer 221 has a relatively high cooling velocity, and plus the stress restraining effect of the elastic body, different positions of the rigid plastic layer 221 may have a synchronous cooling velocity. Accordingly, the shrink marks may not appear on the rigid plastic layer 221, thus the surface of the rigid plastic layer 221 may have better uniformity and smoothness. Thereafter, the flexible plastic layer 222 is able to be formed on a high quality rigid plastic layer. The flexible plastic layer 222 itself is able to restrain the stress, and the elastic body which is fixed to the lateral side is also able to restrain the stress, thus an inner stress generated in the cooling process may have little effect to the flexible plastic layer. Therefore, shrink marks may not appear on the surface of the flexible plastic layer.

In this embodiment, the flexible plastic layer 222 overlays the entire rigid plastic layer 221.

In other embodiments, the flexible plastic layer 222 may be formed on a portion of the rigid plastic layer 221, depending on requirements of the vehicle window component.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for manufacturing a vehicle window component, comprising:
 providing a vehicle window substrate and an elastic body;
 adhering the elastic body to a surface of the vehicle window substrate, wherein the surface is close to a lateral side of the vehicle window substrate; and
 implementing an injection molding process for forming an encapsulation, wherein the injection molding process is performed at an injecting molding temperature lower than a melting temperature of the elastic body, wherein the formed encapsulation is located on the lateral side, wherein the encapsulation embraces the elastic body, and wherein a linear distance between the elastic body and an outer edge of the vehicle window substrate is larger than or equal to 4 mm.

2. The method according to claim 1, wherein the elastic body is porous.

3. The method according to claim 1, wherein the elastic body comprises triphenyl phosphate, vulcanized rubber, ethylene-propylene-diene monomer rubber or polyurethane.

4. The method according to claim 1, wherein a ratio of a thickness of the elastic body to a thickness of the encapsulation is less than or equal to 20%.

5. The method according to claim 1, wherein implementing the injection molding process for forming the encapsulation comprises:
   implementing the injection molding process for forming a rigid plastic layer; and
   implementing the injection molding process for forming a flexible plastic layer on at least a portion of the rigid plastic layer.

6. The method according to claim 1, wherein the elastic body is adhered to the surface of the vehicle window substrate by an acrylic pressure sensitive adhesive or a silicone pressure sensitive adhesive.

7. The method according to claim 1, wherein the vehicle window substrate comprises organic glass, polyvinyl chloride or inorganic glass.

8. A vehicle window component comprising:
   a vehicle window substrate;
   an elastic body adhered to a surface of the vehicle window substrate, wherein the surface is close to a lateral side of the vehicle window substrate; and
   an encapsulation located on the lateral side, wherein the encapsulation embraces the elastic body, and wherein a linear distance between the elastic body and an outer edge of the vehicle window substrate is larger than or equal to 4 mm.

9. The vehicle window component according to claim 8, wherein the elastic body is porous.

10. The vehicle window component according to claim 8, wherein the elastic body comprises triphenyl phosphate, vulcanized rubber, ethylene-propylene-diene monomer rubber or polyurethane.

11. The vehicle window component according to claim 8, wherein a ratio of a thickness of the elastic body to a thickness of the encapsulation is less than or equal to 20%.

12. The vehicle window component according to claim 8, wherein the encapsulation comprises:
   a rigid plastic layer embracing the elastic body; and
   a flexible plastic layer overlaying at least a portion of the rigid plastic layer.

13. The vehicle window component according to claim 8, wherein the elastic body is adhered to the surface of the vehicle window substrate by an acrylic pressure sensitive adhesive or a silicone pressure sensitive adhesive.

14. The vehicle window component according to claim 8, wherein the vehicle window substrate comprises organic glass, polyvinyl chloride or inorganic glass.

* * * * *